United States Patent [19]

Bell

[11] Patent Number: 4,765,644
[45] Date of Patent: Aug. 23, 1988

[54] FOLDABLE CART

[76] Inventor: Laurence G. Bell, 7 Endicott Terrace, Welland, Ontario, Canada, L3C 5B1

[21] Appl. No.: 5,235

[22] Filed: Jan. 20, 1987

[51] Int. Cl.⁴ .............................................. B62B 3/02
[52] U.S. Cl. .................................. 280/641; 280/644; 280/651; 280/33.99 A
[58] Field of Search ............... 280/642, 644, 649, 651, 280/650, 33.99 R, 33.99 S, 641

[56] References Cited

U.S. PATENT DOCUMENTS

| | | | |
|---|---|---|---|
| 174,597 | 3/1876 | Walker | 280/644 |
| 220,214 | 10/1879 | Bellows, Jr. | 280/644 |
| 1,718,851 | 6/1929 | Brown | 280/643 |
| 2,467,900 | 4/1949 | Maine | 280/641 X |
| 3,194,577 | 7/1965 | Berlin | 280/643 |
| 3,337,230 | 8/1967 | Golding | 280/644 X |
| 4,222,585 | 9/1980 | Crothers | 280/654 |
| 4,473,234 | 9/1984 | Egen | 280/650 X |
| 4,478,427 | 10/1984 | Hyde et al. | 280/650 X |

FOREIGN PATENT DOCUMENTS

| | | |
|---|---|---|
| 515583 | 8/1955 | Canada . |
| 2822944 | 12/1978 | Fed. Rep. of Germany . |
| 335942 | 12/1903 | France . |
| 1488375 | 6/1967 | France . |

Primary Examiner—John J. Love
Assistant Examiner—Tamara Finlay
Attorney, Agent, or Firm—McConnell and Fox

[57] ABSTRACT

A folding cart designed to function as a supporting walker or a stackable grocery cart. The frame consists of two pivoted parts, the shorter pivoted at its upper end to points near the center of the longer, and the longer extending thereabove to form a handle. A foldable strut joins the pivoted parts below their junction. A fabric receptacle is foldably supported from the frame generally above the junction of the two pivoted parts. Suitable wheels or pivoted castors are mounted adjacent the lower ends of the two pivoted parts.

9 Claims, 3 Drawing Sheets

FOLDABLE CART

FIELD OF THE INVENTION

This invention relates to foldable wheeled vehicles and associated foldable receptacle, in particular, to 4-wheeled foldable carts of flexible design permitting use both as a walker and a shopping cart.

DESCRIPTION OF THE PRIOR ART

Numerous foldable wheeled vehicles have been proposed in the past. Many early patents such as U.S. Pat. No. 174,597 Mar. 7, 1876 and U.S. Pat. No. 220,214 patented Oct. 7, 1879 disclose foldable baby carriages having four wheels and a collapsible carrier.

Other more recent patents such as U.S. Pat. Nos. 3,194,577 and 3,337,230 disclose baby walkers which are 4-wheeled vehicles of a foldable design including a collapsible receptacle, in this case, the receptacle being the baby support. Other 4-wheeled collapsible carriers include portable clothes baskets such as the one disclosed in U.S. Pat. No. 2,467,900 Apr. 19, 1949, and various folding lawn carts such as the one shown in U.S. Pat. No. 4,222,585 issued Sept. 16, 1980. In the latter case, however, the folding lawn carts are rarely 4-wheeled vehicles.

None of the foregoing provide any support for the user except in the case of the baby walkers in which case the user is within the collapsible fabric receptacle. None of the carts or carriages when folded appear to be stably selfstanding, and none is arranged to permit stacking.

SUMMARY OF THE INVENTION

In accordance with the present invention, a flexibly designed collapsible cart is provided with an associated collapsible fabric receptacle. The design is such as to be sufficiently stable as to provide support for the user to permit the cart to be used as a walker, to permit wide variations in load-carrying capacity, to stand stably when collapsed and of a design which permits minor modification so that a number of such carts may be stacked.

DESCRIPTION OF THE PREFERRED EMBODIMENT

Figure 1:
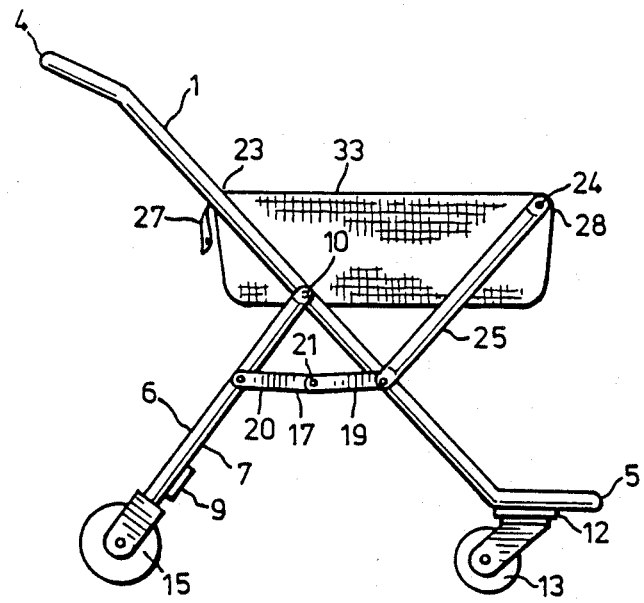
FIG. 1 is an elevational view of a first embodiment of this invention.
Figure 4:
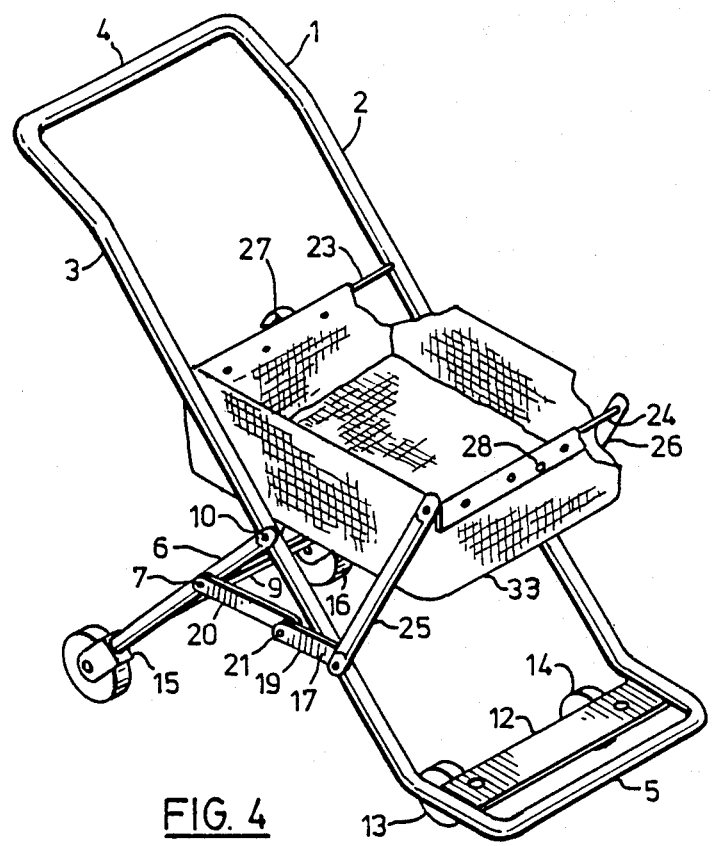
FIG. 4 is a perspective view of the cart in FIG. 1.

As will be seen in FIGS. 1 and 4, the cart consists of a frame member 1 in the form of a substantially rectangular loop of tubular material having two side members, 2 and 3, and two end members, 4 and 5. A second frame member 6 consists of two legs 7 and 8 joined near their lower end by a cross-member 9 and connected to the first frame member 1 by bolts 10 and 11 which pass through the ends of legs 7 and 8 and side members 3 and 2 respectively, thus supporting the legs 7 and 8 on the first frame member 1.

The lower end of frame member 1 is bent near its end into a plane on which the cart is to travel. Closely adjacent to the bend, a cross-member 12 is joined by suitable means, for example welding, to each of the side members 2 and 3. A pair of wheels 13 and 14 are mounted on swivels attached to the cross-member 12. A similar pair of wheels 15 and 16 are mounted in trunnions attached to the lower ends of legs 7 and 8 respectively.

A collapsible strut 17 connects side member 3 of the first frame member to leg 7 of the second frame member. A similar collapsible strut 18 connects side member 2 to leg 8. Strut 17 comprises two arms 19 and 20 with arm 19 being pivotally connected to side portion 3 of frame member 1, and 20 being pivotally connected to leg 7. The two arms 19 and 20 are joined at their centre point by a threaded member fixedly attached to arm 19, passing through arm 20, and secured thereto by a wing nut 21. In a similar manner, strut 18 consists of two arms and their associated central pivot, also fastened by means of wing nut here designated 22.

The receptable 33 comprises a box-shaped flexible bag of suitable fabric. One end of the bag is fastened to a rod 23 which is joined at each of its ends to the side members 2 and 3 of the frame member 1. The other end of the bag is joined to a rod member 24 which is joined at each of its ends to arm members 25 and 26 respectively. The lower ends of the arm members 25 and 26 are pivotally connected to the side members 3 and 2 respectively.

Figure 2:
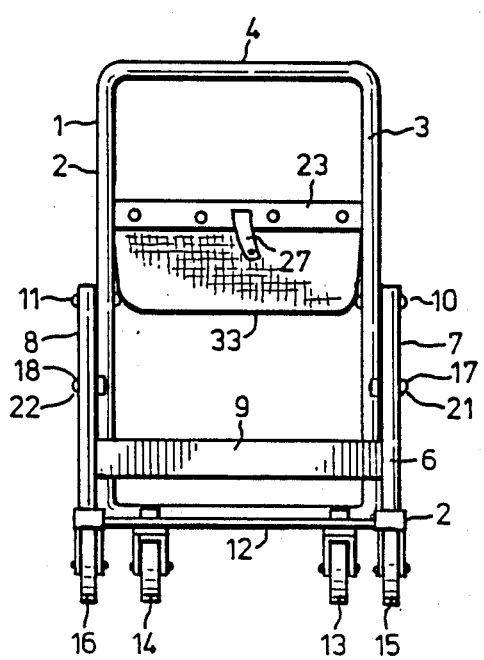
FIG. 2 is a rear elevational view of the cart shown in FIG. 1.

In operation, the cart is arranged as shown in FIGS. 1, 2 and 4 with the frame members spaced as far apart as permitted by the struts 17 and 18. As will be seen, the upper end of frame member 1, that in end member 4, which is the handle of the cart, falls almost directly over the axes of wheels 15 and 16, thus ensuring that downward forces on the handle produce a very small couple for causing rotation of the cart about the wheel axis. The centre of gravity of the cart is well forward of the axes of wheels 15 and 16 and therefore produces a relatively large couple as compared to that produced by the handle around the same axes. The handle of the cart therefore provides substantial support for the user.

Figure 3:
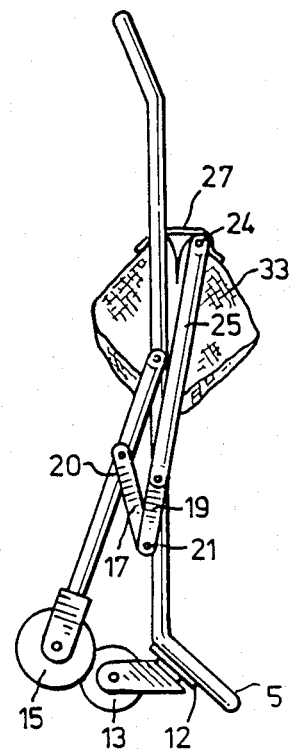
FIG. 3 is a view of the cart of FIG. 1 collapsed.

When not in use, the struts 17 and 18 can be collapsed permitting wheels 16 and 14 to approach each other as shown in FIG. 3. The cart may be maintained in its collapsed position by tightening wing nuts 21 and 22. As will be seen in FIG. 3, when in this collapsed position, the cart balances on wheels 13 and 14 on one side and on the end member 5 on the other with the centre of gravity of the cart substantially directly above a point between these two bearing points.

As shown in FIG. 3, the receptacle also may be collapsed and maintained in this position by means of a strap 27 joined to the centre of the back of the receptacle and fastened by means of a dome fastener 28 to the front of the receptacle.

As will be seen in FIG. 2, wheels 15 and 16 are spaced further apart than wheels 13 and 14 and thus the wheels are permitted to nest as shown in FIG. 3.

Figure 5:
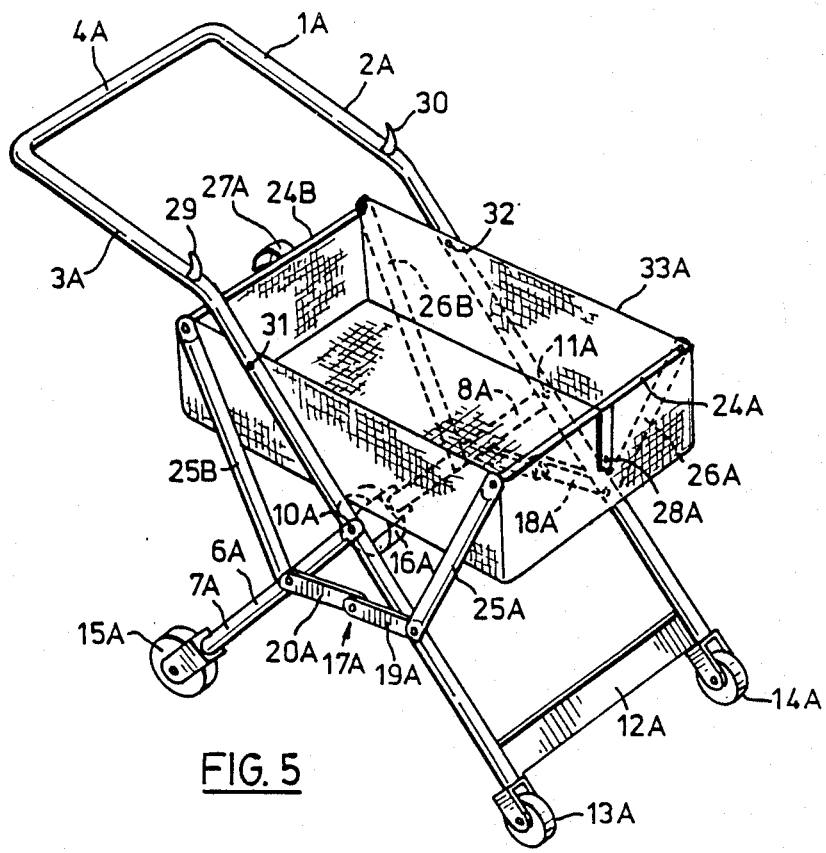
FIG. 5 is an perspective view of a modified form of the cart to permit stacking.
Figure 6:
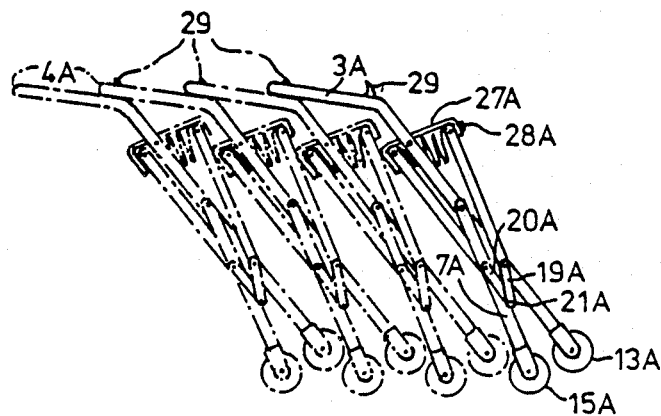
FIG. 6 is an elevational view of a plurality of carts of the type illustrated in FIG. 5 in their stacked position.

A variation of the cart is shown in FIGS. 5 and 6. It will be noted in FIGS. 5 and 6 that similar designations have been used for similar components, but with an "A" designation to indicate they differ from the components of the first embodiment. Here the first frame member 1A is similar in shape to the frame member 1 of FIG. 1, but the upper or handle member is bent closer to the pivot point joining legs 7A and 8A to the side members 2A and 3A. Struts 17A and 18A are substantially identical to struts 17 and 18 of the first embodiment and are similarly pivotally connected to the side members 2A and 3A and to the legs 7A and 8A and, at their centre points, with wing nut connectors 21A and 22A.

The receptacle once more is formed of suitable fabric and is supported at its front upper edge by means of rod 24A and a pair of arms 25A and 26A. The receptacle is larger than that of the previous form and has an additional rod and pair of arms 24B and 25B, 26B respectively, supporting its rear upper edge. The receptacle is now attached to the frame with bolts 31 and 32 through grommets in the fabric of the receptacle.

Although the can now has two sets of support arms rather than one, the folding of the cart frame and receptacle is the same except that the back of the receptacle has now to be folded in as well as the front.

For the variation of FIG. 5, a detent 29 is provided on side member 3A and a similar detent 30 is provided on side member 4A. These detents are in the form of a rearwardly projecting hook. As will be seen in FIG. 6, the cart of FIG. 5 may be stacked with other carts of the same design. To stack a cart, the frame is folded as described above in the first embodiment and the receptacle is folded by collapsing arms 25A, 26A and 25B, 26B in toward the frame. The upper member 4A of the folded cart is then made to engage the detents 29 and 30 of the cart lower in the stack, thus maintaining the completely folded cart in its stacked position.

When a user wishes to obtain a cart, he simply lifts the handle 4A away from the detents 29 and 30 of the lower cart, rolls the cart away from the stack, and unfolds the frame and receptacle.

It will be seen in all embodiments that the relationship between support arm angle and depth of receptacle is important to prevent the receptacle from folding when loaded. The design should be such that the load produces a vector force on bar 24 which has a direction below that of the arms 25 and 26, thus causing the arms 25 and 26 to tend to rotate in an outward direction and to maintain the receptacle fully extended.

As will be seen, the load placed in the receptacle induces a tension in the upper edge of the receptacle, and as a result, this upper edge may have to be reinforced with a heavier fabric than that of the remainder of the receptacle, and similarly, that portion of the fabric receptacle that is joined to rods 23 and 24 may have to be reinforced to support the load in an adequate manner.

The embodiment of FIG. 5 is depicted with fixedly supported wheels at front and back. To change to fixedly supported wheels all round, the couple caused by a downward force on the handle member 4 has to be increased by moving the handle backwards with respect to the rear wheels 15 and 16 to make it easy to lift the weight off the front wheels for steering.

The member 9 or 9A between rear leg members 7 and 8 or 7A and 8A is important for structural stability of the cart. Whatever the design of cart, the member is also useful, and is designed for bracing a foot against to help lift the front wheels over an obstacle.

While the invention has been described in association with a preferred embodiment and one variation, it will be understood that, because of the flexible design, various other minor modifications can be made without departing from the general intent. For example, while the embodiment shown in FIGS. 1 and 2 is intended as a walker and therefore structurally rugged, the embodiment shown in FIGS. 5 and 6 may be of lighter construction, since the mass is not required to support the user. Also as is seen, the size of receptacle, the method of its attachment to the frame, and the relative position and shape of various components may change slightly depending on the intended use. Although the embodiment of FIG. 5 is depicted with fixedly supported wheels at front and back, it is apparent that a cart of similar design, with double support arms and/or stacking ability, could have pivotally supported wheels at the front like the embodiment of FIG. 1.

I claim:

1. A foldable cart comprising a first unitary frame member having side members, a lower end member and an upper end member forming a transverse handle and having a first pair of wheel adjacent its lower end member;

a second frame member having a lower end member and side members connected at their upper ends to a pair of first pivot points intermediate the upper and lower ends of the side members of said first frame member and having a second pair of wheels at the lower ends of its side members;

a pair of collapsible struts joining each of said first and second frame members below said first pair of pivot points;

a recpetacle comprising a rectangular fabric bag having sides and front and rear ends and suspended from said frame members by means of a pair of linear trnasverse rods joined to the upper edge of each end of said bag and supported by said frame members;

both of said rods being connected to the side members of said first and second frame members by arms connected to the ends of said rods, said arms being connected to the side members of said frame members at second pivot points and the edge of each side of the receptacle being fastened to the side members of said first frame member above said second pivot points.

2. A foldable cart as claimed in claim 1 wherein said first frame member lower end member extends beyond said first pair of wheels.

3. A foldable cart as claimed in claim 1 wherein said first pair of wheels are pivotally mounted.

4. A foldable cart as claimed in clam 1 wherein the lower end member of said second frame member is fixed between said side members a substantial distance above said second pair of wheels.

5. A foldable cart is claimed in claim 1 wherein both of said rods are connected to the side members of said first and second frame members by arms connected to the ends of said rods and pivotally connected to the side members of said frame members and wherein the edge of each side of the receptacle is fastened to the side members of said first frame member above said pivot points.

6. A foldable cart as claimed in claim 1 wherein said second pair of wheels when in its normal operating position.

7. A foldable cart as claimed in claim 1 wherein said second pair of wheels are further apart than said first pair of wheels so that when said cart is in its folded position said first pair of wheels nest between said second pair of wheels.

8. A foldable cart as claimed in claim 1 wherein the lower end member of said first member and said first pair of wheels serve to stabley support said cart in its folded position.

9. A foldable cart comprising:
- a first unitary frame member having side members, a lower end member and an upper end member, forming a transverse handle and having a first pair of wheels adjacent its lower end member;
- a second frame member having a lower end member and side members connected at their upper ends to a pair of pivot points intermediate the upper and lower ends of the side members of said first frame member and having a second pair of wheels at the lower ends of its side members;
- a pair of collapsible struts joining each side member of said first and second frame members below said pivot points;
- a receptacle comprising a rectangular fabric bag having sides and front and rear ends and suspended from said frame members solely by means of a pair of linear transverse rods joined to the upper edge of each end of said bag and supported by said frame members;
- at least one of said rods being connected to the side members of one of said frame members by arms connected to each end of said one rod and pivotally connected to the side members of said one frame member;
- wherein said handle is substantially vertically above the axis of said second pair of wheels when in its normal operating position;
- and including a pair of detents on the side members of said first frame member on the upper surface of said side members each detect being positioned at a point on the side member a distance below the transverse handle of said first frame member to coincide with the position of the handle of a nested folded cart and having a rearwardly curved surface shaped to conform to the cross-section of the handle of said nested folded cart and so retain the folded cart in its nested position.

* * * * *